United States Patent [19]

Kang et al.

[11] Patent Number: 4,654,381
[45] Date of Patent: Mar. 31, 1987

[54] MOLDABLE FRICTION ELEMENT COMPOSITION AND METHOD OF MAKING THE SAME

[76] Inventors: Won H. Kang, 10-3, Sinsa-Dong, Eunpyeong-Ku, Seoul; Ki H. Chung, 30-24, Changjeon-Dong, Mapo-ku, Seoul, both of Rep. of Korea

[21] Appl. No.: 751,492

[22] Filed: Jul. 3, 1985

[30] Foreign Application Priority Data

Jul. 20, 1984 [KR] Rep. of Korea ............... 84-4321[U]

[51] Int. Cl.$^4$ ................................................. C08J 5/14
[52] U.S. Cl. ..................................... 523/149; 523/152; 523/155; 523/156; 523/157; 523/158; 523/159
[58] Field of Search ............... 523/149, 152, 155, 156, 523/157, 158, 159

[56] References Cited

U.S. PATENT DOCUMENTS

| | | | |
|---|---|---|---|
| 4,217,255 | 8/1980 | Griffith | 523/156 |
| 4,278,584 | 7/1981 | Noguchi et al. | 523/156 |
| 4,369,263 | 1/1983 | Matsushima et al. | 523/157 |
| 4,505,963 | 3/1985 | Ogiwara | 523/149 |

FOREIGN PATENT DOCUMENTS

| | | | |
|---|---|---|---|
| 58-208374 | 12/1983 | Japan . | |
| 59-22984 | 2/1984 | Japan | 523/149 |
| 59-24772 | 2/1984 | Japan | 523/149 |
| 83-2534 | 11/1983 | Rep. of Korea . | |

*Primary Examiner*—Ronald W. Griffin
*Attorney, Agent, or Firm*—Holman & Stern

[57] ABSTRACT

The compositions of friction element for molding and the friction element for molding formed from the composition characterizing by addition of any one or more than two of the cermet powder (A) contained 75-50% of the mixed carbon and 25-50% of the alloy of stainless and iron series, the cermet powder (B) contained 75-50% of the mixed carbon and 25-50% of the alloy of tungsten and iron and/or the alloy of molybdenum and iron series or the cermet powder (E) of 75-50% of the mixed carbon and 25-50% of metal iron series, in range of 15-50%.

3 Claims, No Drawings

MOLDABLE FRICTION ELEMENT COMPOSITION AND METHOD OF MAKING THE SAME

The present invention relates to moldable friction element composition, using in light load or heavy load such as a brake lining wheel braker, a disk for wheel brake, a clutch and the like, those added plastics and specific cermet powder which are used in the industry or a similar friction element field.

More particularly, the invention relates to a moldable friction element composition improved a prior invention of this applicant comprising plastics and cermet powder contained oil coke carbon and metal Fe sereis as major component of the friction element and the other known components disclosed in publication No. 83-2534 (now Korean Patent No. 16455) of the Korean Patent Gazette No. 884 (hereinafter refer to as "Prior invention").

BACKGROUND AND PRIOR ART

The prior invention related to moldable friction element compositions prepared by substitution cermet powder (D) consisted of oil coke carbon and metal Fe series for the whole or a part of inorganic binders for the friction element. But it is found that the composition has faults as follows:

(a) The above mentioned cermet powder (D) contains 20-35% of metal Fe. Thus, frictional force of the friction substance contained the cermet power (D) is reduced by oxidation of metal Fe on the surface when the cermet powder (D) is exposed to the friction surface under severe oxidating condition.

(b) The friction substance added the cermet powder (D) of the above prior art has the low coefficient of friction, e.g. about 0.29-0.30. That is, the surface the friction substance is hard solid having superior abrasion resistance but when it is rubbed on the other object, it has specific adhesive frictional action. Therefore, the frictional substance is favourable in its brake force but the smooth brake force may be often reduced by the specific frictional force and in any case, frictional noise may be occured.

(c) As a fabric binder, asbestos is added to the friction element but it is known all over the world that it should not be used in the industry since it is harmful to persons.

The Detailed Description of the Invention

Accordingly, it is an object of the present invention that it provides the friction element for molding in which they have not faults of the above (a),(b) and (c) or (b) and (c). Characteristic of the present invention are as follows:

(1) Major compositions of the friction element of the prior invention, only comprise the cermet powder (D) contained oil coke carbon as carbon source and metal Fe sereies but those of the friction element of the present invention comprise cermet powder (A) consisted of mixed carbon combined oil coke and graphite carbon as carbon source and alloy of stainless and Fe series, or cermet powder (B) consisted of said mixed carbon and alloy of tungsten and/or molybdenum and Fe series so that the oxidation of the friction element as described in relation to the above prior art is reduced remarkably and the specific friction action is controlled suitably to improve friction brake and to remove noise by friction.

(2) According to the above article (1), when the cermet powder (E) comprised the mixed carbon and metal Fe series, or mixed cermet powder which the cermet powder (E) is combined with said cermet powder (A) and/or (B), are employed respectively, as major components of the friction element for molding, since the oxidation of the friction substances therefrom occures slightly but specific adhesive friction action is reduced greatly, the friction brake is not accompanied with noise and further, ability of the brake is improved more smoothly than that of the friction element contained only the cermet powder (D) in the prior invention.

(3) In accordance with international trend prohibiting the use of asbestos, it is another object that the present invention provides friction element used inorganic fibre except asbestos.

The constitution and the effect of the present invention are as described below:

In this specification, all percent(%) is weight percent (wt %) except for cases indicated herein specially.

In compositions of the friction element for molding comprising inorganic fibre except asbestos, inorganic binders selected optionally, plastics maintaining stability in range of temperature of 200°-400° C. in which plasticizer may be added or not and cermet powder, the present invention relates to the friction element for molding characterizing by adding thereto in range of 15-50%, any one or more than two of cermet powders consisted of 75-50% of the mixed carbon and 25-50% of the alloy of stainless steel and Fe series (A), or 75-50% of the mixed carbon and 25-50% of the alloy of tungsten and Fe and/or the alloy of molybdenum and Fe series (B), or 75-50% the mixed carbon and 25-50% of the metal Fe series (E), respectively, wherein components of the mixed carbon and the metal compositions are as the following description of components:

Description of Components

The mixed carbon is a carbon composition including 90-70% of oil coke carbon and 10-30% of graphite carbon, the alloy of stainless steel and iron (Fe) is alloy of 7-27% of Ni and/or Cr and 93-73% of iron, the alloy of tungsten and iron is alloy of 5-7% of W and 95-93% of iron, the alloy of molybdenum and iron is alloy 5-7% of Mo and 95-93% of iron, the metal iron is Fe of 97-100% in purity.

Preparation of the cermet powders (A), (B) and (E) for the friction element for molding of the present invention also is accomplished by adding a supporting agent for cermet comprised 2 to 8 parts of anhydrous silicic acid and 0.2 to 0.5 parts of potassium oxide and/or magnesium oxide to 100 parts of composition of raw material for cermet, in accordance with preparation of the cermet powder (D) of the prior invention.

Generally, in the friction element for molding, since composition rate of the friction element is identical or similar to that of the raw material thereof, in composition rate of the friction element of the present invention described above, composition rate of the raw material also should be included.

As described above, the friction element of this invention is composed of combination of various known and new components as described below:

Known Components and New Components

Known components of this invention are those except characteristic components constituting this invention.

These known components are used by combination with new components of this invention.

Detail description of those are as follows:

Examples of inorganic fibre except asbestos series are selected from, for example, glass fibre, rock wool, slug wool, ceramic fibre, silicate fibre, silica fibre or carbon fibre, known inorganic fibre except asbestos series. Examples of inorganic binder are selected from, for example, powder type binders such as potassium carbonate, barium sulfate, alumina, potassium sulfate, talc, kaolin, mullite, potassium silicate or the other silicate series, silica powder and the other inorganic powder binder, as known binders.

Since organic fibre is broken by frictional heating, it does not preferred to use as fibre binder but it may be used in any case.

Examples of organic fibre are selected from fibres of cellulose series, synthetic fibres such as aliphatic polyamide, polyacrylonitrile, aromatic polyamide, and the like. Aramide fibre, as known fibre of aromatic polyamide series is preferred.

Examples of thermosetting plastic are selected from phenol resin, melamine resin, urea resin, unsaturated polyester resin, epoxy resin, mixed resins thereof and the other known thermosetting plastics.

Examples of plasticizer are selected from cashew nut oil, cashew dust or the other known plasticizers.

The above-mentioned known components are used by combination with new components of this invention. Examples of new component of the present invention are the cermet powder (A) and/or the cermet powder (B) and the cermet powder (E).

These new components are illustrated as follows:

Cermet Powder (A), (B) and (E)

These are new components used as major ingredients in the present invention. These cermet powder (A), (B) and (E) have the following characteristics:

(1) Having better abrasion resistance than the friction element composed of the cermet powder (D) of the prior invention, (2) Reducing particular adhesive friction of the friction element to suitable level in comparison with that of the prior invention and finally, indicating suitable friction brake together with adhesive friction by the friction element of the instant invention.

(3) Having friction brake smoothly and efficiently,

A characteristic of ingredients for the cermet powder (A), (B) and (E) are that carbon of the components is the mixed carbon comprising 90–70% of oil coke carbon and 10–30% of graphite carbon.

Another characteristic of ingredients for the cermet powder (A) and (B) are that metal of the components are the alloy of stainless and Fe contained 7 to 27% Ni and/or Cr and the remainder % of Fe (92 to 73%), or the alloy of tungsten and/or Molybdenum and Fe contained 5 to 7% of W and/or Mo and the remainder % of Fe (95 to 93%) and they form antioxidative cermet powder.

In general, it was well known that in composition of products from the alloy of stainless and iron or products from the ally of tungsten and/or molybdenum and iron, even if carbon ingredient accompanied with metal iron is small amount, it should be limited to, for example, less than 0.3% to maintain physical property and chemical antioxidation. Accordingly, since the cermet powder (A), (B) of the present invention include more than 0.3% of the mixed carbon, it may be understood that antioxidation of these cermet powder (A) and (B) will be reduced rather than that of products from the alloy of stainless steel and iron. But it is found that resistance for oxidation of the alloy of stainless steel and iron and the ally of tungsten and/or molybdenum and iron contained in the cermet powder (A) and (B) is similar with antioxidation of known products from the alloy of stainless and iron or the ally of tungsten and/or molybdenum and iron. It is unexpected result. And the cermet powder (E) is characterized that since carbon ingredient thereof comprise the mixed carbon, it differs from the cermet powder (D) using in friction element of the prior invention. Smooth friction effect due to the mixed carbon is very similar to that of the cermet powder (A) and (B).

The friction element for molding of the present invention formed by adding cermet powder (A), (B) and (E) as described above has comparable features as follows:

Comparable Features of the Friction Element for Molding of the Present Invention Features compared the friction element for molding obtained as above with that of the prior invention are varied in accordance with difference of ingredients of the compositions but common comparable features are as follows:

(a) The friction element added the cermet powder (A) and (B) improves greatly reduction of friction and generation of heat by oxidation due to formation of oxides of iron or metal on the friction surface in case of friction brake or in the atmosphere of excess wet and heat. Accordingly, change of the frictional action is improved greatly comparing with that of the prior invention. On the contrary, the frictional property of the friction element added the cermet powder (D) from coke carbon plus metal iron as the prior invention may be reduced by production of oxide of iron and generation of heat by the oxidation.

(b) While the friction element for molding added the cermet powder (D) mentioned in the prior invention has excess the specific adhesive friction action, that added the cermet powder (A) and (B) and/or (E) reduce it remarkably in comparison with that of the prior art. Therefore, in the friction brake of the friction substance from the friction element of the present invention, the friction substance added the cermet powder (D) also is reduced adhesive friction in comparison with the prior invention, and is increased action of smooth brake and rate of abrasion resistance. The smooth brake and rate of abrasion resistance are increased, i.e. abrasion loss is reduced, depending upon increasing of graphite carbon contained in the mixed carbon of the cermet powders (A),(B) and (E).

Accordingly, it should be understood that the smooth brake and reduction of abrasion loss are resulted from the graphite carbon of the mixed carbon.

(c) For the purpose of determining characteristics of the friction element of the present invention, the abrasion loss depending on each temperature and the coefficient of friction ($\mu$) calculated from the temperatures, for three kinds of samples (I),(II), (III), of the friction element of this invention was measured in accordance with the JIS D-4411. The resulting coefficients of friction of three samples are $\mu(350°$ C.$)=0.40$, and $\mu(100°-300°$ C.$)=0.42-0.48$ and thus, the above result corresponds to standard of the JIS D-4411.

(d) Rate of abrasion resistance (abrasion loss) for a control sample (I) formed from the friction element added the cermet powder (D) of the prior art, a control sample (III) formed from the friction element added the cermet powder (A) or (B), a control sample (II) formed from the friction element added the cermet powder (E) and a standard sample formed from cast iron product is measured using a constant speed type friction tester, in accordance with JIS D-4411 of Japan, equipped a nicrome friction plate of R.P.M. 5000, and the result and the oxidation extent are shown in the following table.

| Samples | Defaced thickness during abrasion test for 2 hours | Abrasion resistance rate (Non-abrasion resistance) | Temperature (°C.) of Nicrome friction plate | Oxidation extent |
| --- | --- | --- | --- | --- |
| Standard Sample (cast iron) | 2.4 | 1 | 150–160° | +++ |
| Sample (I) (A prior invention) | 0.3 | 8 | " | + |
| Sample (II) (This invention) | >0.20 | >12 | " | — |
| Sample (II) (This invention) | 0.20 | >12 | " | + |

Referring to this table, it is shown that the abrasion loss rate of the control samples (II) and (III) of the instant present was improved more greatly than that of the control sample (I) of the prior art, wherein the abrasion resistance rate (abrasion loss) shows a reciprocal number of the number divide the defaced thickness, 0.3 and 0.20 mm, of each control samples (I), (II) and (III), by the defaced thickness, 2.4 mm, of the standard sample. By the numbers shown these abrasion resistance rate, it is understood that product from the friction element of this invention was identical with that of the prior invention added the cermet powder (D) in the oxidating action but the former was advanced greatly in comparison with the later in the abrasion resistance. Such improved abrasion resistance is resulted from the use of the cermet powder (A), (B) and (E) of this invention.

(e) Contacting sufficiently suitable amount of 120 and less mesh powder of each kinds of the cermet powder (A) and (B) used in this invention and the cermet powder (D) of the prior art, with mixed gas contained saturated 100° C. of vapor and same temperature and volume of gas, maintaining 100° C., for 10 days to be oxidized and after increase of weight thereof was determined to compare each other. The result was showed that quantity of oxidation of the cermet (A) and (B) used in this invention is about 1/30–1/50 of that of the cermet powder (D) used in the prior invention. Therefore, it indicates that antioxidation of the cermet powder (A) and (B) used in this invention was risen 30 times –50 times in comparison with the cermet powder (D) of the prior invention. Since oxidation quantity of the cermet powder (E) is identical to that of the cermet (D), anti-oxidation of the cermet powder (E) was not improved.

The present invention is illustrated by the following examples. The numbers of these examples are all weight parts or wt %.

EXAMPLE 1-1

Preparation of cermet powder (A) (reference)

90 parts of 120 and less mesh oil coke carbon and 10 parts of graphite carbon are mixed to form 100 parts. 74 parts of metal iron powder, 3 parts of nickel powder and 18 parts of chromium powder are mixed to form 100 parts of mixed metal powder. Rates of component of the mixed metal powder correspond to the known 18-8 alloy of stainless and iron.

To 100 parts of raw material powder for cermet consisted of 25 parts of the above stated mixed metal powder and 75 parts of the above stated mixed carbon, a supporting agent for cermet contained 2 parts of anhydrous silicic acid, 0.5 part of potassium oxide, 0.5 parts of magnesium oxide is added and the resulted mixture is heated at 1400°–1600° C. of known temperature for cermet under reduction atmosphere by hydrogen to give mixed composition thereof which is pulverized to obtain the cermet powder (A). The cermet power (A) is used to a composition such as an example 2-13 to give the friction element for molding of this invention by molding the composition in accordance with known method.

EXAMPLE 1-2

Preparation of cermet powder (B) (reference)

This composition is prepared according to the method described above in Example 1-1 but substituting 95 parts of metal iron powder and 5 parts of tungsten powder for rates of metal powder forming the mixed metal power in Example 1-1 to give the cermet powder (B).

EXAMPLE 1-3

Preparation of cermet powder (B) (reference)

This composition is prepared according to the method described above in Example 1-2 but substituting 5 parts of molybdenum for 5 parts of tungsten to give the cermet powder (B).

EXAMPLE 1-4

Preparation of cermet powder (E) (reference)

According to all condition of Example 1-1 but this composition is prepared substituting 100 parts of metal iron powder for 100 parts of the mixed metal powder to give the cermet powder (E).

EXAMPLE 1-5 (reference)

According to the method described above in Example 1-1 to 1-5 but this composition is prepared substituting $Fe_2O_3$, $Ni_2O_3$, $Cr_2O_3$, $WO_3$, $MoO$ corresponding to rate of molecular weight thereof, respectively, for metal iron (Fe), nickel (Ni), chrominum (Cr), tungsten (W) and molybdenum (Mo), respectively, to obtain the cermet (A), (B) or (E) of Example 1-1 to 1-4.

Using cermet powder (A), (B) or (E) obtained above in Examples 1-1 to 1-5, the friction element and composition thereof for molding of the present invention are obtained as compostions of various components listed in the following table.

COMPOSITION

| Components | Examples (Unit: wt %) | | | | | | | | | | | |
| --- | --- | --- | --- | --- | --- | --- | --- | --- | --- | --- | --- | --- |
| | 2 | 3 | 4 | 5 | 6 | 7 | 8 | 9 | 10 | 11 | 12 | 13 |
| Phenol Resin | 25 | 25 | 25 | 25 | 25 | 25 | 25 | 25 | 23 | 25 | 25 | 25 |
| Cashew Oil | 1.5 | 1.2 | — | — | 1.2 | — | 1.2 | 1.2 | 1.0 | 1.2 | 1.0 | 1.0 |
| Cashew Dust | — | — | 3.0 | — | — | — | — | — | — | — | — | — |
| Generation Cellulose Fibre | — | — | — | — | — | — | — | 5.0 | — | — | — | — |
| Glass Fibre | 10 | — | — | — | — | — | — | 10 | 25 | — | 20 | — |
| Aramide Fibre | 10 | 15 | — | — | — | — | 20 | — | — | 16.8 | — | — |
| Stainless Fibre | — | — | — | — | — | — | — | — | — | — | — | — |
| Brass net and Brass Fibre | — | — | 15 | — | — | — | — | — | — | — | — | — |
| Wooden Pulp | — | — | — | — | — | — | — | — | — | — | — | — |
| Potassium Carbonate | — | — | — | — | 5.0 | — | 6.0 | — | 4.0 | 3.0 | — | — |
| Carbon Fibre | — | — | — | 30 | — | — | — | — | — | — | — | 16 |
| Copper Powder | — | — | — | — | — | — | — | — | 7.0 | — | — | — |
| SiO$_2$ | 4.0 | 4.0 | — | 3.0 | 3.0 | 3.0 | 1.8 | 4.0 | — | 3.0 | 5.0 | 3.0 |
| BaSO$_4$ | 5.0 | 5.0 | 5.0 | — | — | 5.0 | — | 4.8 | 5.0 | — | 6.0 | 5.0 |
| AL$_2$O$_3$ | 4.0 | 5.0 | 5.0 | 7.0 | 6.0 | 7.0 | 6.0 | 5.0 | 5.0 | 6.0 | 6.0 | 5.0 |
| Cermet Powder (A) | — | 44.8 | — | — | — | — | 15 | — | 30 | 25 | — | — |
| Cermet Powder (B) | — | — | — | 35 | 24.8 | — | 25 | — | — | — | — | 20 |
| Cermet Powder (E) | 40.5 | — | 28 | — | — | 30 | — | 45 | — | 20 | — | 25 |
| Copper and iron Powder | — | — | — | — | 5.0 | — | — | — | — | — | — | — |
| Aramide Fibre Textile | — | — | — | — | 3.0 | — | — | — | — | — | — | — |
| Glass Fibre Textile | — | — | 20 | — | — | 30 | — | — | — | — | — | — |
| Total Amount | 100 | 100 | 100 | 100 | 100 | 100 | 100 | 100 | 100 | 100 | 100 | 100 |

Found value of the coefficient of friction ($\mu$) listed in the above table all are similar. Therefore, description for each efficient of friction is omitted herein and the representative coefficient of friction ($\mu$) for one temperature of Examples 2-13 were measured according to JIS D-4411 and the result is as follows:

| Temperature (°C.) | Items | | | |
| --- | --- | --- | --- | --- |
| | abration loss $d_1 - d_2$ (cm) | applied temperature (fm) (kg) | coefficient of friction ($\mu$) | |
| | | | Found | Recovery |
| 100 | 0.0031 | 55 | 0.45 | 0.38 |
| 150 | 0.0054 | 55 | 0.44 | 0.42 |
| 200 | 0.0052 | 52.5 | 0.42 | 0.40 |
| 250 | 0.0089 | 60 | 0.48 | 0.41 |
| 300 | 0.0102 | 52.5 | 0.42 | 0.39 |
| 350 | 0.0113 | 46.25 | 0.40 | — |

Referring to the above table, since $d_1$ is thickness of sample before abrasion test, $d_2$ is that after the test, $d_1-d_2$ is thickness after worn the test sample by the abrasion test, fm is weight of a heavy substance used in the abrasion test, $\mu$ is the coefficient of friction, "Recovery" is indicated recovered state of the coefficient of friction upon each temperature. Upon the above-listed composition table, it teaches that the composition of the friction element for molding of this present exhibit suitable coefficient of friction element and term of the abrasion is remarkably longer than the conventional-friction element. In view of the above-mentioned facts it is understood that all objects of the present invention as described above accomplished perfectly.

We claim:

1. A moldable friction element composition comprising inorganic fiber harmless to human beings, inorganic binders, thermosetting resins maintaining stability at temperatures ranging from 200° to 400° C. with or without a plasticizer, and a powdered cermet, wherein said powdered cermet is at least one selected from the group consisting of:
   (a) a powdered cermet comprising 75–50% by weight of a blended carbonaceous material and 25–50% by weight of stainless steel alloyed iron;
   (b) a powdered cermet comprising 75–50% by weight of a blended carbonaceous material and 25–50% by weight of tungsten alloyed iron and/or molybdenum alloyed iron; and
   (c) a powdered cermet comprising 75–50% by weight of a blended carbonaceous material and 25–50% by weight of metallic iron;

said blended carbonaceous material being a mixture of 90–70% by weight of oil cokes and 10–30% by weight of graphite, said powdered cermet being added to said composition in an amount of 15–40% by weight based on the total weight of the composition.

2. In the known composition of a frictional element including a cermet powder containing a mixture of oil cokes of a carbon component and a metallic powder, inorganic or organic materials, non-asbestos fibre, filler and plastics, a process for preparation of a frictional element from a mixed carbon and thermo-setting resin comprising, first forming a cermet powder by heating a mixed carbon consisting of oil cokes and graphite carbon as carbon component in said mixture in conventional cermet-forming condition, then mixing said cermet powder with other known components containing one of the said thermo-setting resin and then finally hardening said mixture to the hardening temperature of said thermo-setting resin.

3. A process in accordance with claim 2 in which the amount of oil cokes ranges from 90 wt% to 70 wt%, and the graphite carbon ranges from 10 wt% to 30 wt% of the cermet composition.

* * * * *